J. GAYLEY, DEC'D.
H. B. GAYLEY AND W. S. REED BEING EXECUTORS.
RECOVERY OF POTASSIUM VALUES FROM FUMES.
APPLICATION FILED NOV. 1, 1918.
1,414,353. Patented May 2, 1922.
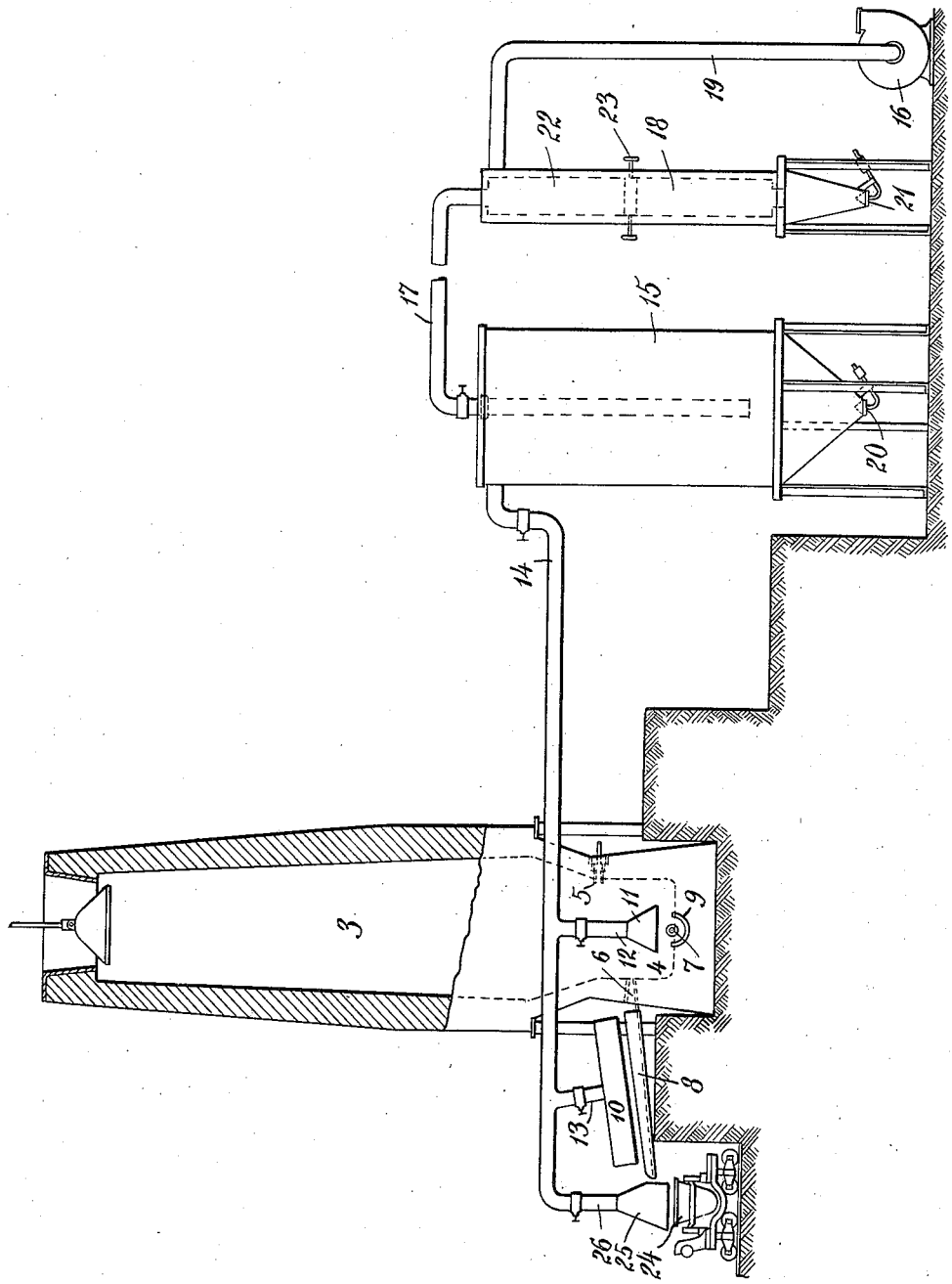

UNITED STATES PATENT OFFICE.

JAMES GAYLEY, OF NEW YORK, N. Y.; HENRY B. GAYLEY AND WALTER S. REED EXECUTORS OF SAID JAMES GAYLEY, DECEASED.

RECOVERY OF POTASSIUM VALUES FROM FUMES.

1,414,353. Specification of Letters Patent. Patented May 2, 1922.

Application filed November 1, 1918. Serial No. 260,757.

*To all whom it may concern:*

Be it known that I, JAMES GAYLEY, a citizen of the United States, residing at No. 555 Park Avenue, New York city, in the county of New York, State of New York, have invented certain new and useful Improvements in the Recovery of Potassium Values from Fumes; and I do hereby declare the following to be a full, clear, and exact description of the invention, such as will enable others skilled in the art to which it appertains to make and use the same.

This invention relates to the operation of blast furnaces for the production of pig-iron, spiegeleisen, ferro-manganese, ferro-silicon, and the like, in the customary manner, and, in connection therewith, the recovery of compounds of the alkali-metals from the hearth of the blast furnace, that is, from that portion of the furnace below the tuyeres.

In the operation of a blast furnace, the furnace is charged with ore, coke and limestone, in proper proportions, and is supplied with a heated air blast. In the usual operation of such a furnace, the metal is tapped or cast four or five times a day, and the slag is drawn off two or three times between casts.

The ores, fuel and flux employed in the blast furnace charge contain alkalies in varying amounts. According to locality, and the degree of beneficiation, there is contained a varying but appreciable amount of the alkalies, potash and soda, in the ingredients of the blast furnace charge.

As the charge descends in the furnace, and the various reactions incident to the production of the metal take place, the alkali metals react with carbon, nitrogen and carbonic acid to form alkali-metal compounds.

In that portion of the furnace above the tuyeres, these alkali-metal compounds exist principally in a vaporized state, and, in a prior joint application Serial # 248,838, filed August 8, 1918, there is set forth an improved method of operation of blast furnaces according to which the akali-metal compounds can be withdrawn and recovered without interference with the normal blast furnace operation.

The present invention is based upon the discovery that alkali-metal compounds are set free in the form of a fume from the slag tapped from the furnace and that the amount of alkali-metal compounds set free from the slag, and which can be recovered in the form of a fume, can be promoted by proper handling and treatment of the slag; and that alkali-metal compounds can also be recovered in appreciable amount from the fume which is blown out at the slag and metal notches during the customary tapping operations.

The present invention, accordingly, contemplates the recovery of alkali-metal compounds from the hearth of the blast furnace, below the tuyeres, in the form of fume or vaporized compounds, as an incident to the normal operation of the blast furnace, and without interference with such normal and customary operation or with the tapping of the metal and the slag in the usual manner.

When tapping the slag and casting the metal, there escape from the notch or opening appreciable volumes of white fume which is commonly dissipated into the atmosphere and lost. This fume is similarly given off from the slag as it is tapped from the blast furnace and comes in contact with the air, and this fume is likewise commonly dissipated into the atmosphere and lost. I have found that the fume thus commonly permitted to escape carries alkali-metal compounds in a vaporized condition and in considerable amount, and that the alkali-metal compounds can be recovered therefrom by collecting the fume and conveying it to appropriate recovery apparatus, and that the alkali-metal compounds can thus be recovered from the fume in sufficient amount to make profitable their recovery on a commercial scale. In fact, all of the fume escaping from the slag and metal notches during the tapping operations, and liberated from the products tapped from the furnace hearth, is rich in the compounds of the alkali metals, and can be collected and recovered in accordance with the process of the present invention.

In order to collect and recover such compounds, a hood is suspended above the slag notch and trough, and a similar hood is suspended above the metal trough, and the fume escaping from the respective notches and given off from the slag tapped from the furnace is drawn off by suction, through a suitable conduit or conduits, to the collecting and recovery apparatus. The arrangement of the hoods is such that there is collected thereby both the fume escaping from the notches and carrying the alkali metal compounds in a vaporized condition, and the fume containing the compounds vaporized and given off from the slag upon its exposure to the air. When the furnace is working hot, the fume is dense and in large volume.

I have further found that the hot slag flowing from the furnace has still commingled with it a considerable quantity of vaporizable constituents, and that these constituents can be released therefrom, in the form of a fume, by agitation of the slag in the slag ladle, as by stirring or poling the slag, and that the liberated fume containing the alkali-metal compounds can be collected by the same or similar means and apparatus used for collecting the fume from the slag at the flushing and casting periods.

I have further found that when the hot slag is dumped from the ladles, a further considerable volume of fume escapes, and that this fume similarly contains alkali-metal compounds in appreciable amount and can be collected and the values recovered therefrom in a manner similar to that above described in connection with the fume escaping from the slag during the tapping thereof and while in the slag ladle.

The process of the present invention, accordingly, provides for the collection of the fume escaping from the furnace during the tapping operations and the fume given off or liberated from the products of the furnace hearth which are tapped therefrom, which fume is rich in alkali-metal compounds; so that this fume, which has heretofore been commonly dissipated into the atmosphere and lost, is made available as an important source of alkali-metal compounds. The recovery of these valuable alkali-metal compounds, in the form of such fume, is effected as an incident to the normal operation of the blast furnace for the production of metal and without interfering with such operation.

The accompanying drawing illustrates an apparatus adapted for carrying out the described invention. The drawing represents a blast furnace, partly in vertical section and partly in elevation, and shows, in elevation, a suitable collecting and condensing system for the recovery of the alkali-metal compounds. The drawing is of a somewhat diagrammatic and conventional character, and, for convenience of illustration, the condensing apparatus is shown on a somewhat enlarged scale as compared with the scale of the blast furnace itself.

Referring to the drawing, 3 represents the blast furnace, which as ordinarily constructed, is from 80 to 100 feet high. The furnace hearth is indicated at 4, the slag opening or notch at 6, and the metal notch at 7. One of the tuyeres is represented at 5, the other tuyeres for simplicity of illustration, being omitted.

The cinder or slag trough for conveying the slag from the slag notch to the slag ladle is indicated at 8, and the metal trough at 9. Above these respective troughs are suspended the hoods 10 and 11 which can be constructed in any practical shape and installed in a manner that permits of their being swung away from their positions over the troughs when it is found necessary to do so. The fume escaping from the respective notches or liberated from the slag flowing therethrough is drawn into the respective hoods and thence into the branch conduits 13 and 12, which lead respectively to the main conduit 14 connecting with the condensing chamber 15. The branch pipes 13 and 12, are provided with suitable regulating valves, as shown, for shutting off either of these pipes, or for regulating the draft therethrough. The draft is induced through the conduits by means of the suction fan 16, or by other appropriate means.

The chamber 15 may be water-cooled, if necessary, to promote the condensation of the condensible compounds therein and to lower their temperature. The solid matter in the fume is condensed in this chamber to a large extent. The fume, with its remaining solid matter in suspension, is conducted from the chamber 15 through the pipe 17 to the bag filter chamber 18, of any suitable design, or to any other means for removing the particles carried in suspension. The suction fan 16 is connected with the chamber 18 by means of the pipe 19 so that it will induce a draft through the chambers 15 and 18, and the conduits and pipes leading thereto. The materials condensed and collected in the chambers 15 and 18 are discharged at the hopper bottoms which have apertures provided with suitable valves, as, for instance, the conical, pivoted and counterweighted bell stoppers 20 and 21.

The pipe 17, extending from the collecting chamber 15 to the bag filter 18, can be of any required length to cool down the hot gases to a temperature that will not injuriously affect the filter 22. This cooling may be done by prolonging the pipe so that the gases will have a sufficient length of travel to effect the required reduction in temperature, or by means of water-jets (not shown) externally applied thereto. The filter 22 is provided with shaking rods 23 to promote the discharge of the material collected on the filter.

The slag ladle for receiving the slag tapped from the furnace is indicated at 24. Above it is arranged a hood 25, which is connected with the pipe 26, and thence with the pipe 14. A large quantity of fume is liberated from the slag as it falls into the ladle and a further quantity can be liberated by agitation of the molten slag in the ladle in any desired manner. The fume thus liberated is collected by the fan and is drawn off through the pipes 26 and 14, to the collecting chamber 15, the withdrawal of the fume being effected by the suction fan 16, in the manner above described.

When the slag is discharged from the slag ladle to the slag dump or to other place of discharge a further quantity of fume will be liberated therefrom, and this fume can be similarly collected and the alkali-metal compound recovered therefrom.

The collecting and condensing system illustrated is typical of many others that might be substituted therefor, and the invention is not restricted to the particular devices and system illustrated, but is capable of modification to accomplish the purposes herein set forth, as will be readily understood. While but a single condensing system or unit is illustrated and described, the practice of the invention is not limited to a single unit or to any particular character of unit for carrying out the process described. It is also clear that the fume may be collected by electric precipitation and deposition.

The fume that escapes during the tapping operations and that which is given off from the slag, will, on being exposed to the air, become oxidized, and will ordinarily contain a considerable quantity of alkali metal carbonates; so that the product obtained by the collection and condensation or precipitation of this fume will similarly be of a characteristic and novel composition, and its recovery thus represents a new source of supply for obtaining potassium and other alkali metal compounds.

Having thus described my invention, what I claim is:

The method of operating blast furnaces, which comprises carrying on the blast furnace process to produce metal and slag in the customary manner, tapping the metal and slag from the furnace hearth, collecting the slag in a ladle, and collecting the fume given off from the slag while in the ladle, the giving off of the fumes being promoted by agitation of the slag in the ladle.

In testimony whereof I affix my signature.

JAMES GAYLEY.